June 18, 1957  D. KAPUCZIN  2,795,923
GARDENING TOOL
Filed April 9, 1956
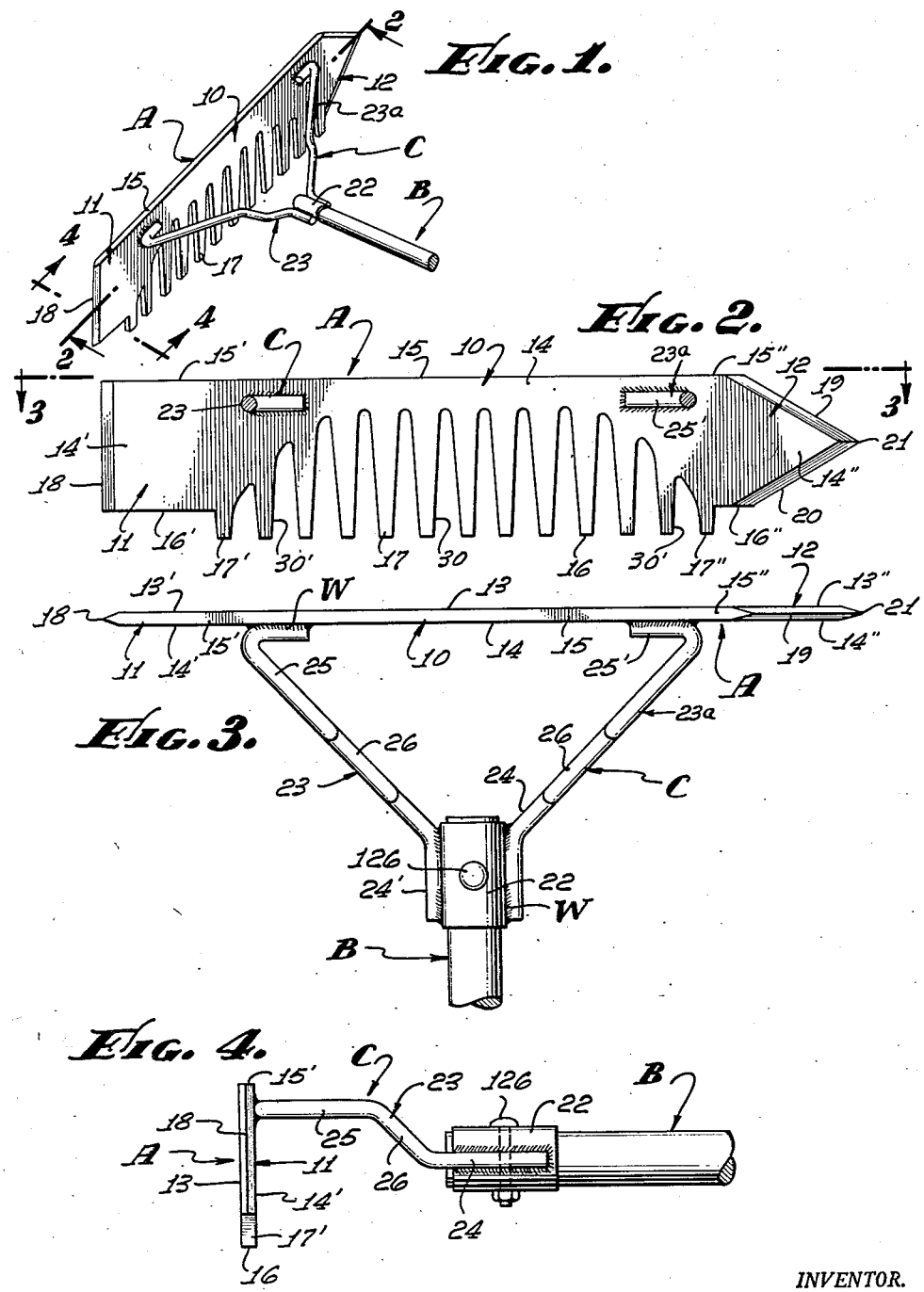
INVENTOR.
DAVE KAPUCZIN
BY
Georges A. Maxwell
AGENT

United States Patent Office 2,795,923
Patented June 18, 1957

2,795,923

GARDENING TOOL

Dave Kapuczin, Mentone, Calif.

Application April 9, 1956, Serial No. 576,839

3 Claims. (Cl. 56—400.05)

This invention has to do with a gardening tool and is more particularly concerned with a combination rake, hoe and weeder.

The object of the present invention is to provide a gardening tool with an elongate work engaging head having a serrated or notched central portion and serviceable as a rake, a rectangular blade-like end portion at one end of the head and serviceable as a hoe, and an outwardly convergent or pointed blade-like end portion at the other end of the head and serviceable as a weeder.

Another object of the present invention is to provide a gardening tool of the character referred to having a work engaging head, an elongate handle and mounting means securing the head to the handle so that the handle is centrally aligned with the blade-like end portions of the head.

Another object of my invention is to provide a gardening tool of the character referred to wherein the mounting means includes a pair of divergent arms projecting from the handle and connected with the central portion of the work engaging head, adjacent the blade-like end portions thereof.

A further object of my invention is to provide a work engaging head of the character referred to wherein the ends of the central rack portion are reinforced and stiffened to rigidly support the blade-like portions projecting therefrom.

The various objects and features of my invention will be fully understood from the following detailed description of a typical preferred form and application of my invention, throughout which description reference is made to the accompanying drawings, in which:

Fig. 1 is a perspective view of the gardening tool provided by the present invention. Fig. 2 is an enlarged elevational view of the work engaging head of my gardening tool and taken as indicated by line 2—2 on Fig. 1. Fig. 3 is a plan view of the gardening tool that I provide and taken as indicated by line 3—3 on Fig. 2. Fig. 4 is an enlarged side elevational view of my gardening tool and taken as indicated by line 4—4 on Fig. 1.

The gardening tool provided by the present invention is a combination rake, hoe and weeder and includes a work engaging head A, a handle B, and mounting means C connecting the head to the handle.

The work engaging head A of the gardening tool that I provide is an elongate plate-like member having an elongate central portion 10 in the form of a rake, a rectangular blade-like end portion 11 in the form of a hoe and projecting or continuing from one end of the central rake portion 10, and a pointed blade-like end portion 12 in the form of a weeder and projecting or continuing from the other end of the central rake portion 10.

The central rake portion 10 of the work engaging head A is characterized by flat vertically disposed front and rear walls 13 and 14 normally horizontally disposed top and bottom edges 15 and 16. The bottom edge 16 of the central portion 10 is notched or serrated to establish a plurality of teeth or tines 17, which teeth are serviceable to pick up and gather leaves and the like, when the construction is used as a rake.

The end portion 11 of the work engaging head A, projecting from one end of the central portion 10, is substantially rectangular in form and is characterized by flat vertically disposed front and rear walls 13' and 14', normally horizontally disposed top and bottom edges 15' and 16' and a normally vertically disposed end or cutting edge 18.

In practice, the hoe end portion 11 of the work engaging head A projects from the central portion 10 so that the front and rear walls and the top edges of both of said portions are aligned and fare smoothly into each other, while the bottom edge 16' of the portion 11 is relieved or vertically offset from the bottom edge 16 of the central portion 10, and so that the adjacent end tooth 17' on the central portion 10 projects below and is clear of the bottom edge 16' of the end portion 11'.

The weeder end portion 12 of the work engaging head A, projecting from the other end of the central portion 10, is primarily adapted to be used to chop or cut weeds and is characterized by flat, vertically disposed front and rear walls 13" and 14", normally horizontally disposed top and bottom edges 15" and 16", and upper and lower inclined and outwardly convergent cutting edges 19 and 20. The cutting edges 19 and 20 converge to establish a sharp cutting point 21, which point occurs on an axis midway between the top and bottom edges 15" and 16".

In practice, the weeder end portions 12 of the work engaging head A projects from the central portion 10 so that the front and rear walls and the top edges of both of said portions occur in the same planes and fare smoothly into each other, while the bottom edge 16" of the portion 12 is relieved, or vertically offset from the bottom edge 16 of the central portion 10, so that the end tooth 17" on the central portion 10 projects below and clear of the bottom edge 16" of the end portion 11".

The handle B that I provide is a conventional elongate rake handle, round in cross-sectional configuration and preferably formed of wood.

The mounting means C, adapted to connect the head A to the forward or front end of the handle B, includes, a handle receiving sleeve 22 and a pair of forwardly divergent support arms 23, 23a fixed to and projecting forwardly from the sleeve to connect with the central portion 10 of the work engaging head, at opposite ends thereof and adjacent the end portions 11 and 12.

The arms 23 and 23a are alike and each has a rear end portion 24, a front end portion 25 and a central or intermediate portion 26.

The forward terminal end portion 25' of the forward end portions of the support arms are bent or turned to extend in a plane parallel with the plane of the head A and are secured to the rear walls 14 of the central portion 10 of the head as by welding W, or the like.

The terminal end of the rear end portions 24' of the support arms are bent or turned to extend along an axis parallel with the axis of the handle receiving sleeve 22 and are fixed to opposite sides of the sleeve by welding W' or the like, as clearly illustrated in the drawings.

The sleeve 22 of the mounting means C is adapted to slidably receive the forward end of the handle B and is shown as being held or maintained engaged therewith by means of a suitable screw fastening means 126 extending through both the sleeve and the handle.

The forward terminal end portions 25' of the arms 22 are secured to the back side 13 of the central portion 10 of the head A adjacent the upper edge 15 and so that the forward portions 25 of the arms occur above and do not interfer with the teeth or tines 17 of the head, when the tool is employed as a rake.

The central or intermediate portions 26 of the arms 22 of the means C are angularly related to the front and rear portions 25 and 24, that is, the central portions are inclined downwardly as they project rearwardly from the head A, with the result that the rear end portions 24 of the arms extend in a plane parallel with and spaced below the front end portions 25.

In practice, the intermediate portions 26 of the arms 22 are inclined to a degree and are of sufficient longitudinal extent so that the rear end portions 24 and the longitudinal axes of the sleeve 22 and the handle B occur in a plane coincidental with the central longitudinal axis of the end portions 11 and 12 of the head.

With the above relationship of parts, it will be apparent that by rotating the garden tool that I provide 90° in one direction or the other, that is, so that the top and bottom edges 15 and 16 of the head A are vertically disposed, the hoe end portion 11, or the weeder end portion 12, of the head, can be employed or put to use.

It will be further apparent that when the tool is rotated in the manner set forth above, the end portions 11 and 12 are in alignment with handle B, and as a result, are easy to direct and manipulate.

The serrations or notches 30 in the bottom edge 16 of the central rake portion 10 of the head A, and establishing the rake tines 17, are of substantial vertical extent and terminate short of the top edge 15 so as to leave sufficient stock along the top or upper portion of the head to provide the central rake portion 10 with enough rigidity to withstand normal use and abuse when the structure is employed as a rake.

In the preferred carrying out of the invention, the notches 30' at the ends of the central portion 10 of the head, from which end portions 11 and 12 project, and in close proximity to the point where the arms 23, 23a of the mounting means C join the head, become progressively shallower, or of less vertical extent, as clearly illustrated in Fig. 2 of the drawings.

With the above relationship of parts, it will be apparent that the ends of the central portion 10 of the head A, from which the end portions 11 and 12 project, are reinforced to be of sufficient rigidity and strength to properly support the said end portions 11 and 12, when they are put to their intended use.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A gardening tool of the character referred to including, a work engaging head, an elongate handle, and mounting means connecting the head to one end of the handle, the work engaging head being an elongate plate-like member having a central elongate rake portion, a blade-like hoe portion projecting from one end of the central portion and a blade-like weeder portion projecting from the other end of the central portion, the central rake portion of the head having flat vertically disposed front and rear faces, straight horizontally disposed top and bottom edges, and a plurality of upwardly extending notches in the bottom edge establishing a plurality of longitudinally spaced work engaging teeth, the hoe end portion of the head having flat vertically disposed front and rear faces, straight horizontally disposed top and bottom edges and a straight vertically disposed cutting edge, the weeder end portion of the head having flat vertically disposed front and rear faces, straight horizontally disposed top and bottom edges and longitudinally outwardly convergent cutting edges, the mounting means including a member engaged around one end of the handle, a pair of elongate rearwardly convergent arms having front portions connected to the ends of the central portion of the head adjacent the upper edge thereof, rear end portions connected to the said member on the handle, and rearwardly and downwardly inclined central portion extending between the front and rear portions whereby the handle extends in a plane normal to the central longitudinal axis of the head, the notches at the ends of the central portion of the head and establishing the teeth being of less vertical extent as they progress towards the ends of the central portion of the head and so that the ends of the central portion of the head provide rigid support for the end portions projecting therefrom and for the forward ends of the arms of the mounting means secured thereto.

2. A gardening tool of the character referred to including, a work engaging head, an elongate handle, and mounting means connecting the head to one end of the handle, the work engaging head being elongate plate-like member having a central elongate rake portion, a blade-like hoe portion projecting from one end of the central portion and a blade-like weeder portion projecting from the other end of the central portion, the central rake portion of the head having flat vertically disposed front and rear faces, straight horizontally disposed top and bottom edges, and a plurality of upwardly extending notches in the bottom edge establishing a plurality of longitudinally spaced work engaging teeth, the hoe end portion of the head having flat vertically disposed front and rear faces, straight horizontally disposed top and bottom edges and a straight vertically disposed cutting edge, the weeder end portion of the head having flat vertically disposed front and rear faces, straight horizontally disposed top and bottom edges and longitudinally outwardly convergent cutting edges, the bottom edges of the end portion being spaced above the bottom edge of the central portion, the mounting means including, a sleeve engaged around one end of the handle, a pair of elongate rearwardly convergent arms having front portions connected to the ends of the central portion of the head adjacent the upper edge thereof, rear end portions connected to the sleeve on the handle, and rearwardly and downwardly inclined central portion extending between the front and rear portions whereby the central longitudinal axis of the handle is normal to the central longitudinal axis of the end portions of the head, the notches at the ends of the central portion of the head and establishing the teeth being of less vertical extent as they progress towards the ends of the central portion of the head and so that the ends of the central portion of the head provide rigid support for the end portion projecting therefrom and for the forward ends of the arms of the mounting means secured thereto.

3. A gardening tool of the character referred to including, a work engaging head, an elongate handle, and mounting means connecting the head to one end of the handle, the work engaging head being a unitary elongate plate-like member having a central rake portion, a blade-like hoe portion projecting from one end of the central portion and a blade-like weeder portion projecting from the other end of the central portion, the central rake portion of the head having flat vertically disposed front and rear faces, straight horizontally disposed top and bottom edges, and a plurality of upwardly extending notches in the bottom edge establishing a plurality of longitudinally spaced work engaging teeth, the hoe end portion of the head having flat vertically disposed front and rear faces, straight horizontally disposed top and bottom edges and a straight vertically disposed cutting edge, the weeder end portion of the head having flat vertically disposed front and rear faces, straight horizontally disposed top and bottom edges and longitudinally outwardly convergent cutting edges, the front and rear surfaces and the top edges of the central and end portions of the head occurring in common planes, the bottom edges of the end portion being spaced above the bottom edge of the central portion, the mounting means including, a sleeve engaged around one end of the handle, a pair of elongate rearwardly convergent arms having front portions fixed to the rear surface of the central portion of the head adjacent the ends and the upper edge thereof, rear end portions connected to the sleeve on the handle, and rearwardly and downwardly inclined central portion extending between the front and rear portions whereby the longitudinal axis of the handle extends in a plane normal to the central longitudinal axis of the end portions of the head, at a point midway between the ends of the head, the notches in the ends of the central portion of the head and establishing the teeth being of less vertical extent as they progress towards the ends of the central portion of the head and so that the ends of the central portion of the head provide rigid support for the end portion projecting therefrom and for the forward ends of the arms of the mounting means secured thereto.

References Cited in the file of this patent

UNITED STATES PATENTS

| | | |
|---|---|---|
| 816,320 | Harris | Mar. 27, 1906 |
| 908,266 | Jackson | Dec. 29, 1908 |
| 1,798,036 | Schultz | Mar. 24, 1931 |
| 1,800,103 | Pihl | Apr. 7, 1931 |
| 2,080,736 | Cox | May 18, 1947 |

FOREIGN PATENTS

| | | |
|---|---|---|
| 247,931 | Switzerland | Jan. 3, 1948 |